Nov. 29, 1938.  W. C. ROBBINS  2,138,511
SHOCK ABSORBER
Filed March 16, 1938
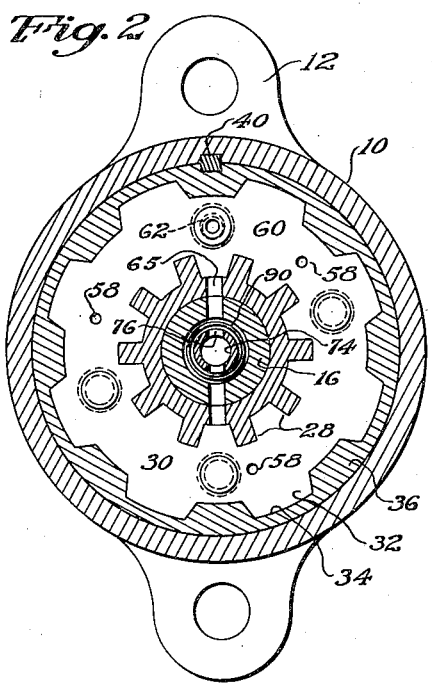
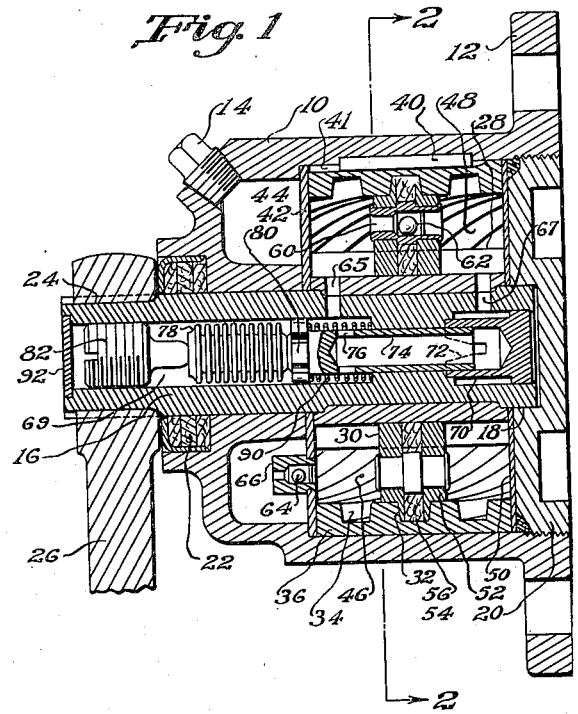
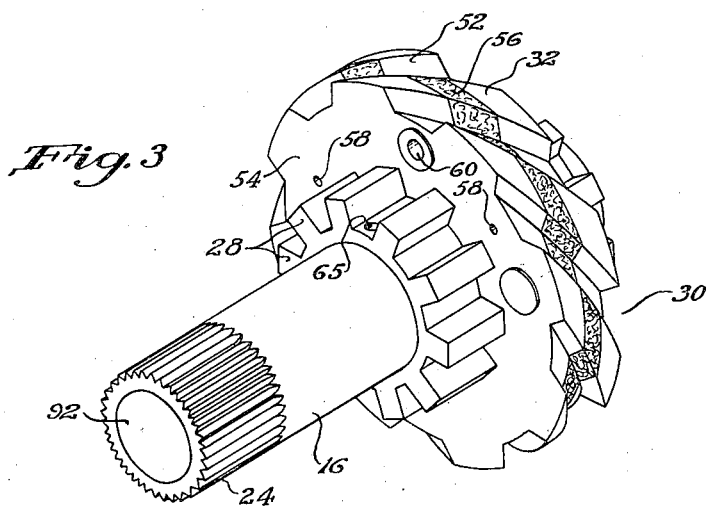
Witness
Paul F. Bryant
Inventor
Walter C. Robbins
by his attorneys Patented Nov. 29, 1938

2,138,511

UNITED STATES PATENT OFFICE 2,138,511

SHOCK ABSORBER

Walter C. Robbins, Bridgeport, Conn., assignor to Frank P. Scully, Cambridge, Mass., and Harry B. Curtis, Bridgeport, Conn., as trustees Application March 16, 1938, Serial No. 196,188

5 Claims. (Cl. 188—88)

The present invention relates to shock absorbers of the fluid type, and is more particularly concerned with fluid shock absorbers of the type shown generally in the patent to McNab No. 1,855,921, dated April 26, 1932.

In this type of shock absorber which is provided with the usual fluid-tight casing and projecting oscillatory arm for connection to an axle or the like, a piston is slidingly keyed to the arm shaft and is caused to traverse lengthwise of the fluid chamber upon oscillation of the shaft by virtue of helical grooves engaging with corresponding teeth on the piston and forming in effect a lead screw for traversing the piston an amount determined by the amplitude of oscillation. The movement of this piston compels fluid flow from one side of the piston to the other as governed by a restricted orifice, the orificial restriction serving to check and retard movements of the oscillating arm particularly on rebound.

It is the object of the present invention to improve and reorganize fluid shock absorbers of this general type in order to insure an efficiently operating mechanism which can be manufactured within practical limitations of cost, and to provide automatic control for fluid flow governed in accordance with changes in viscosity of the fluid due to rising and falling temperatures.

With these and other objects in view, the various features of the invention consist in certain novel features of construction, combinations and arrangements of parts hereinafter described and claimed, the advantages of which will be obvious to those skilled in the art from the following description.

In the accompanying drawing illustrating the preferred form of the invention, Fig. 1 represents an elevation in section of the shock absorber with the outer end of the arm broken away; Fig. 2 is a section in plan taken upon the line 2—2 of Fig. 1; and Fig. 3 is a detail of the reciprocating piston slidingly keyed to the operating shaft.

The shock absorber disclosed in the illustrated embodiment of the invention comprises generally a housing 10, having a drilled attaching flange 12 and a fluid replenishing plug 14. Supported centrally of the housing and extending therethrough is an oscillatory shaft 16, journaled at its end remote from the arm in a closed bearing 18 formed in a closure plate 20, which is threadedly mounted in the housing as indicated in Fig. 1. The shaft 16 at its opposite end projects through an oil-retaining seal 22, and is splined at its outer end 24 to receive the hub of a connecting arm 26, which is attached in the usual manner to the axle or movable part or other portion of the chassis of a motor vehicle or whatever else it may be desired to check.

The shaft 16 is provided intermediate the bearings with a series of longitudinal and parallel teeth 28, which slidingly receive a piston designated generally at 30 through the provision of a centrally disposed opening which fits the toothed or ribbed surface. The outer peripheral portion of the piston is provided with helically disposed teeth or ribs 32 which mesh with correspondingly formed helical grooves 34 in a sleeve 36.

With this construction oscillatory movements of the shaft 16 impart similar movements to the piston 30, which are converted into longitudinal traversing movements of the piston through engagement with the helical traversing grooves. The curved sleeve or liner 36 may preferably be cast in a form such as a die casting and assembled within the cylindrical portion of the housing 10. The sleeve is locked in place within the housing by a key 40 seated in a slot 41 formed in the wall of the sleeve, as indicated in Figs. 1 and 2. When assembled within the housing a partition disk 42 divides a fluid reservoir 44 from the adjacent fluid chamber 46, the second fluid chamber being indicated at 48 at the opposite side of the sliding piston, this chamber being closed by a stationary wall provided through the closure 20 and a sealing plate 50.

I have found by practical experience that great difficulty is experienced in providing for an adequate seal between the periphery of the piston and the lining sleeve on the one hand, and the hub or inner portion of the piston and the splined shaft on the other, if these several parts are fabricated in the normal fashion, first because the tolerances must be exceedingly small to prevent undue leakage, and secondly because with these comparatively low allowable tolerances the cost of the construction is greatly increased, and in addition unusual wear of the contacting surfaces results with a comparatively short tenure of useful life. According to the present invention I have found that by constructing the piston with complementary steel or equivalent metal sections or portions, each having the peripheral helical teeth and hub splines, and by interposing between these complementary portions an inner section or member of leather or its equivalent having corresponding teeth and splines to register with those of the metallic portions, satisfactory sealing may be accomplished without the necessity of close tolerances and with a resulting long tenure of life, particularly if provision is made for the flow of lubricating fluid between the contacting surfaces of the leather cushion and the opposing metallic heads. To this end it will be observed, as shown more particularly in Fig. 3, that I provide complementary portions 52 and 54, each being fashioned with the necessary grooves and splines, and that I interpose between these members upon assembly a similarly fashioned layer of leather or equivalent cushion material 56. With the parts fastened in any appropriate fashion, I have found not only that leakage is avoided even though a loose fit is adopted, and that the piston will function satisfactorily with the sleeve 36 of die cast material or other material softer in composition than that of the piston. For effecting additional lubrication between the metal portions of the piston and the leather inner portion, I provide openings 58 through which seepage or circulation of lubricating fluid is accomplished. The piston is also provided with one or more through openings 60, each provided with a ball check valve 62, which in the illustrated embodiment of the invention checks the flow of oil from right to left, or in other words, from the chamber 48 into the chamber 46, but freely permits the flow of oil in the opposite direction. In addition, fluid flow from the replenishing chamber 44 into the adjacent working chamber 46 is permitted through a ball check 64 located in a housing 66 mounted in the partition member 42, this ball check being designed to permit free replenishment, but to prevent return from the working chamber into the replenishing chamber.

This type of construction permits a comparatively large quantity of fluid to be displaced with small movements of the arm, a movement on the order of 90° to 100° of the arm accomplishing substantially a complete traverse of the working chamber by the piston. Due to the relatively large amount of fluid moved thereby, the instrument with comparatively small over-all dimensions can be made to satisfactorily serve the shock absorbing function without generating extremely high pressures within the shock absorber and requiring in consequence strengthening safeguards. The capacity in a small instrument to handle necessary movements with measurably lower fluid pressures is an important and desirable aspect of this type of shock absorber.

It will be observed from an inspection of Figs. 1 and 2 of the drawing that longitudinal traversing movements of the piston 30 compel a flow of liquid from the chamber 46 to the chamber 48 or vice versa. This is accomplished through the provision of fluid passages 65 and 67 leading respectively from the working chambers 44 and 48 into the hollow bore 69 of the arm shaft. As will be noted from the drawing, these openings in each case are drilled through the splined hub 28 of the shaft 16, and form in effect a single opening moving with the oscillatory motion of the shaft and in constant communication with both the working chambers and the hollow bore of the shaft. In order to control the shock absorbing function, fluid flowing from one chamber to the other is caused to pass through an orifice of predetermined dimensions and characteristics. In order to compensate for the effects of varying temperatures upon the viscosity of the fluid, it is necessary to modify the character of the orifice in accordance with changes of temperature or fluid viscosity, and to this end I provide within the hollow bore of the shaft 16 a sleeve valve 70 mounted in the bore at the end of the shaft and having a tapered slot or opening 72 which is metered by the advanced edge of an inner sleeve 74, as will be evident from Fig. 1. The sleeve 74, which constitutes the movable element of the valve, is slidingly mounted within the interior of the shaft, and is provided with openings 76 to afford communication with the port 65. This movable sleeve is connected in any suitable manner to the free end of a bellows thermostat 78 for movement therewith in both directions. The thermostat is provided with a guiding head 80 and is anchored at its opposite end by virtue of a stud or plug 82 threaded within the shaft. The bellows thermostat is normally filled with a liquid similar in its characteristics to the fluid within the shock absorber, and expanding and contracting with changes in temperature which affect the shock absorber fluid. As the temperature rises the fluid within the bellows expands, causing a like expansion of the thermostat, with a movement from left to right of the sleeve valve. This movement cuts down the size of the orifice 72 and compensates for the greater fluidity or decreased viscosity of the fluid at the higher temperature. As the temperature drops, the bellows thermostat in a like manner contracts, exposing a larger orifice to fluid of increased viscosity. It is possible by proper control of the size of the orifice with this type of compensation to secure virtually a straight-line resistance of the shock absorber regardless of temperature conditions. It will be noted that a return spring 90 is provided for insuring return of the bellows and connected valve upon contraction of the fluid therein. The outer end of the shaft beyond the inserted plug may be closed by a cap 92, the plug itself being adjustable to vary the anchor point of the bellows thermostat and regulate the size of the control orifice and in consequence the resistance of the shock absorber within any given range.

What is claimed is:

1. A shock absorber, comprising a casing having a fluid chamber therein, a hollow shaft extending into the chamber, an arm connected to the shaft, a piston keyed to the shaft to oscillate therewith, connections between the piston and the peripheral wall of the chamber to cause oscillation of the piston to traverse the latter lengthwise of the chamber, fluid passages connecting the longitudinal bore of the shaft with the fluid chamber at opposite sides of the piston, a fixed valve having a metering port mounted in the hollow bore of the shaft, a sleeve slidingly received within the valve to adjust the exposure of the port, a bellows thermostat seated within the hollow bore of the shaft and connected with the sleeve to move the latter in accordance with temperature changes, fluid openings in the sleeve to cause passage of fluid therethrough, and means for anchoring one end of the bellows thermostat lengthwise of the shaft.

2. A shock absorber, comprising a casing having a fluid chamber therein, a die cast liner having a series of helical grooves assembled within the casing, means for locking the liner to the casing, an oscillatory shaft extending within the chamber and centrally thereof, a piston slidingly mounted upon the shaft and having a metallic section and a non-metallic sealing section, and teeth formed upon the periphery of both sections engaging with the grooves of the liner for converting oscillating movements of the piston into longitudinal movements thereof.

3. A shock absorber, comprising a casing having a fluid chamber therein, an oscillatory shaft extending within the fluid chamber, a piston comprising an inner portion of cushion material clamped between outer metallic portions, the composite piston being slidingly keyed to the shaft and having peripheral teeth formed thereon, and helical grooves at the periphery of the fluid chamber engaging with the piston teeth to produce longitudinal movement of the piston upon oscillation thereof.

4. A shock absorber, comprising a casing having a fluid chamber, an operating shaft, a piston comprising complementary metal portions each having peripheral helical teeth, an inner cushion portion having similar teeth clamped between the complementary portions to form when assembled continuous helical teeth, and a liner secured to the casing and having helical grooves formed therein meshing with the teeth of the piston.

5. A shock absorber, comprising a casing having a fluid chamber therein, an oscillatory shaft, a liner having traversing grooves secured to the casing, and a piston comprising complementary metallic portions and an inner leather portion, the various portions being formed in such a manner that when assembled complete helical teeth are formed at the periphery, the piston being slidingly keyed to the shaft, and openings through the complementary portions for the circulation of lubricating fluid therethrough to the inner leather portion.

WALTER C. ROBBINS.